No. 870,693. PATENTED NOV. 12, 1907.
J. H. SHIRLEY.
ROOT PLANTING MACHINE.
APPLICATION FILED MAR. 6, 1906.

2 SHEETS—SHEET 1.

John H. Shirley Inventor

Witnesses
A. J. Todd
Paul H. Todd.

No. 870,693. PATENTED NOV. 12, 1907.
J. H. SHIRLEY.
ROOT PLANTING MACHINE.
APPLICATION FILED MAR. 6, 1906.

2 SHEETS—SHEET 2.

John H. Shirley, Inventor

Witnesses
A. J. Todd
Paul H. Todd.

UNITED STATES PATENT OFFICE.

JOHN H. SHIRLEY, OF MENTHA, MICHIGAN, ASSIGNOR TO A. M. TODD COMPANY, LIMITED, OF KALAMAZOO, MICHIGAN.

ROOT-PLANTING MACHINE.

No. 870,693.  Specification of Letters Patent.  Patented Nov. 12, 1907.

Application filed March 6, 1906. Serial No. 304,607.

*To all whom it may concern:*

Be it known that I, JOHN H. SHIRLEY, a citizen of the United States, residing at Mentha, in the county of Van Buren, State of Michigan, have invented certain new and useful Improvements in Root-Planting Machines, of which the following is a specification.

This invention relates to improvements in root planting machines.

My improved root planting machine is particularly adapted and is specially designed by me for use in planting mint roots, although it is adapted for use in planting other roots.

The objects of this invention are: First, to provide an improved machine adapted for use in planting mint roots which is automatic in its operation. Second, to provide an improved root planting machine by which the roots are evenly distributed. Third, to provide an improved root planting machine in which the liability of clogging is reduced to a minimum. Fourth, to provide an improved root planting machine which is simple and economical in structure and is not likely to get out of repair, and is durable in use.

Further objects, and objects relating to structural details will definitely appear from the detailed description to follow.

I accomplish the objects of my invention by the devices and means described in the following specification.

The invention is clearly defined and pointed out in the claims.

Figure 1:
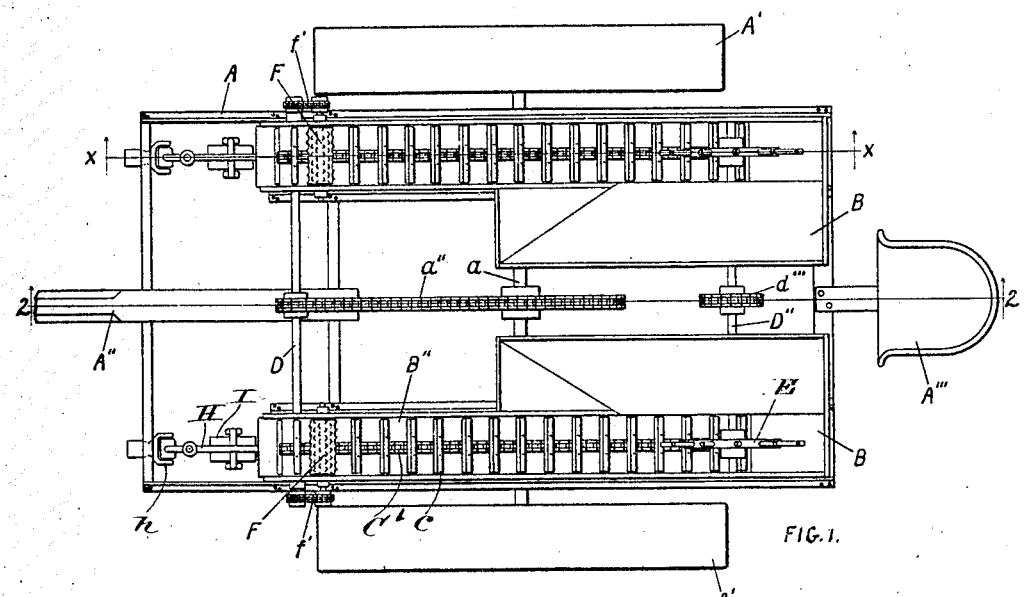
Figure 2:
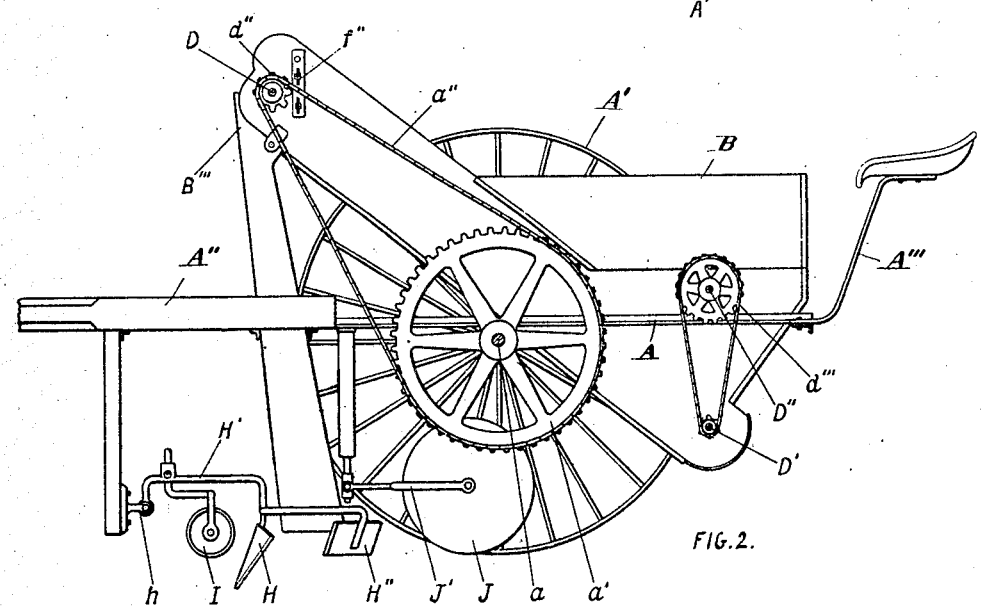
Figure 3:
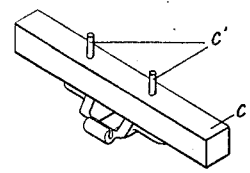
Figure 4:
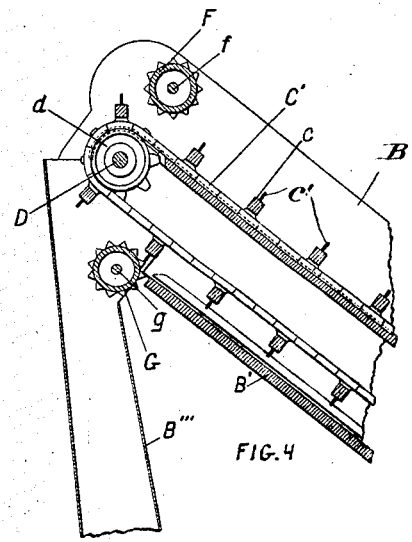
Figure 5:
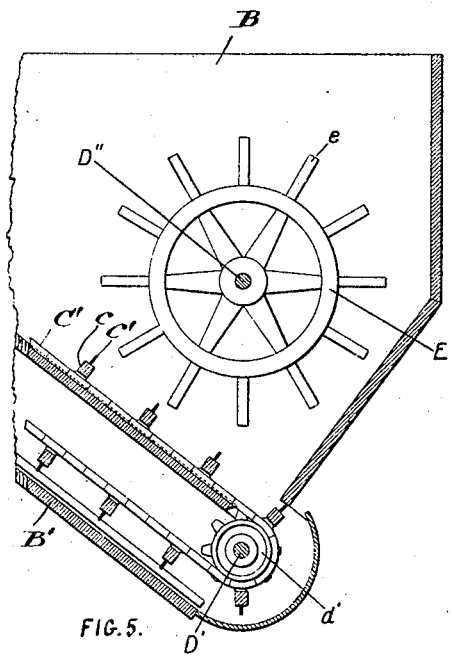

A structure embodying the features of my invention is clearly illustrated in the accompanying drawing forming a part of this specification, in which:

Figure 1 is a plan view of my improved root planting machine, the tongue being broken away. Fig. 2 is a vertical longitudinal section, taken on a line corresponding to line 2—2 of Fig. 1, the tongue, sprockets, sprocket chains, and seat being shown in full lines. Fig. 3 is an enlarged perspective view of one of the feed or delivery conveyer slats or cross-pieces $c$ and Figs. 4 and 5 are detail longitudinal sectional views, through one of the hoppers, taken on a line corresponding to line $x$—$x$ of Fig. 1, showing the form of the hopper and the structure of the feed mechanism.

In the drawings, similar letters of reference refer to similar parts throughout the several views, and the sectional views are taken looking in the direction of the little arrows at the ends of the section lines.

Referring to the drawing, A is the frame of my improved root planting machine. The frame A is preferably rectangular in form, and built of angle iron, although this may be varied as desired. The frame A is mounted upon the axle $a$ of the carrying and driving wheels A′. These wheels are connected to the axle $a$ by suitable mechanism to drive the same, details of which are not illustrated. The tongue A″ is secured to the frame at its forward end and a suitable seat as A‴ for the driver is arranged at the rear.

I preferably construct the machine to plant two rows at once, two hoppers and feed mechanisms being provided. As these are duplicates, I will describe only one. The hopper B is preferably provided with a bottom B′ inclined upwardly toward the front of the machine. The forward part of the hopper as B″ is preferably trough-like in form. At the forward end of the hopper is a delivery chute or tube B‴ which extends downwardly behind the furrow opener H to deliver the roots.

The feed device consists of a suitable delivery conveyer, preferably a chain C′ with cross-pieces or slats $c$ thereon at intervals. The chain is carried and driven by the sprocket wheels $d$ $d'$ which are carried by the shafts D and D′ respectively. The conveyer cross-pieces $c$ are preferably provided with upwardly projecting fingers $c'$ which assist in loosening and tearing the roots apart in the hopper. The shaft D is connected by the sprocket chain $a''$ to the axle $a$ of the driving wheels A′, the axle $a$ being provided with a sprocket $a'$ and the shaft D with a sprocket $d''$ for the chain $a''$. Thus arranged, on the forward movement of the planter the feed conveyers are operated. The sprocket wheels $a'$ and $d''$ are so proportioned that the feed conveyer is operated at the proper speed to deliver the desired quantity of roots. The roots are placed in the hopper after being cut into suitable lengths in quantities. In order that an excess quantity shall not be delivered, I arrange a toothed roller F above the conveyer at its delivery end. The toothed roller F is mounted upon the shaft $f$ which is driven by the sprocket chain $f'$ arranged on suitable sprocket wheels on the shafts D and $f$. This drives the roller F in a direction opposite to that of the conveyer, so that it strikes off or throws back any excess of roots which may be carried up to the delivery point of the conveyer. The shaft of the roller is adjustably supported by the bearings $f'''$, so that it may be adjusted to and from the conveyer to regulate the feed. Similar clearing rollers G are arranged in the spouts B‴ below the feed conveyers to prevent the carrying of the roots back into the hopper.

In order to keep the roots loose and prevent their massing or matting together in the hopper, I provide what I designate as an "agitating" wheel E. This wheel is arranged in the hopper above the lower end of the feed conveyer and is provided with projecting fingers $e$ on its periphery. The roots are thrown into the hopper in a quantity, and the agitators prevent their packing together, so that they are continually in contact with the feed conveyer, in a loose condition. This secures an even delivery of the roots and they are delivered in a continuous stream rather than in bunches.

The agitator wheel is mounted upon the shaft D″, running transversely across the machine. This shaft is driven by the sprocket chain d‴, suitable sprocket wheels being provided on the shafts D′ and D″ therefor.

A furrow opener H is carried by the drag-bar H′ which is pivoted to the frame, as at h. The furrow-opener H is preferably in the form of a double shovel, and the delivery spout is arranged to deliver behind the same.

A gage-wheel, as I, is provided for the furrow-opener, the same being preferably pivoted to the drag-bar thereof. Behind the spout is a covering shovel H″, preferably carried by a drag-bar extending from the drag-bar of the furrow opener. The covering shovel is followed by a press wheel J which is carried by the drag-bars J′ pivoted to the frame A.

By thus arranging the parts, the roots are properly delivered and covered. The furrow-opener and covering means illustrated may be of any desired style, although the form illustrated is simple and effective.

My improved planting machine, as previously stated, delivers the roots in an even manner and the structure is not liable to become clogged in operation. It is comparatively light in weight, so that it can be readily handled by a single pair of horses, and only one man is necessary to operate it. The roots are taken by the feed conveyer from the bottom of the hopper so that all may be delivered therefrom, and proper feed is insured as long as the supply in the hopper lasts.

I have illustrated and described my improved root planting machine in detail in the form preferred by me, although I am aware that it is capable of very considerable variation in structural details without departing from my invention.

Having thus described my invention, what I claim as new and desire to secure by Letters Patent, is:

1. The combination with a main frame of the carrying wheels; an axle therefor on which said frame is mounted; a pair of hoppers having forwardly inclined bottoms; delivery spouts or chutes arranged at the forward ends thereof; furrow openers behind which said delivery spouts are arranged to deliver; feed conveyers arranged in the bottoms of said hoppers, consisting of sprocket chains having cross-pieces thereon, provided with projecting fingers; sprocket wheels for said chains; shafts on which said sprocket wheels are mounted; a driving connection for one of said shafts to said axle; toothed rollers arranged above said feed conveyers at their delivery ends; connections for driving said rollers in a direction opposite to that of said conveyers; toothed clearing rollers arranged below said conveyers at the delivery ends; driving connections therefor; wheels having projecting fingers on their peripheries, arranged in said hoppers above said feed conveyers; a shaft on which said wheels are mounted; and driving connections therefor to the lower feed conveyer shaft, for the purpose specified.

2. The combination with a main frame of the carrying wheels; an axle therefor on which said frame is mounted; a pair of hoppers having forwardly inclined bottoms; delivery spouts or chutes arranged at the forward ends thereof; furrow opers behind which said delivery spouts are arranged to deliver; feed conveyers arranged in the bottoms of said hoppers, consisting of sprocket chains having cross-pieces thereon; sprocket wheels for said chains; shafts on which said sprocket wheels are mounted; a driving connection for one of said shafts to said axle; toothed rollers arranged above said feed conveyers at their delivery ends; connections for driving said rollers in a direction opposite to that of said conveyers; toothed clearing rollers arranged below said conveyers at the delivery ends; driving connections therefor; wheels having projecting fingers on their peripheries, arranged in said hoppers above said feed conveyers; a shaft on which said wheels are mounted; and driving connections therefor to the lower feed conveyer shaft, for the purpose specified.

3. The combination with a main frame of the carrying wheels; an axle therefor on which said frame is mounted; a pair of hoppers having forwardly inclined bottoms; delivery spouts or chutes arranged at the forward ends thereof; furrow openers behind which said delivery spouts are arranged to deliver; feed conveyers arranged in the bottoms of said hoppers, consisting of sprocket chains having cross-pieces thereon; sprocket wheels for said chains; shafts on which said sprocket wheels are mounted; a driving connection for one of said shafts to said axle; toothed rollers arranged above said feed conveyers at their delivery ends; connections for driving said rollers in a direction opposite to that of said conveyers; wheels having projecting fingers on their peripheries, arranged in said hoppers above said feed conveyers; a shaft on which said wheels are mounted; and driving connections therefor to the lower feed conveyer shaft, for the purpose specified.

4. The combination with a main frame of the carrying wheels; an axle therefor on which said frame is mounted; a pair of hoppers having forwardly inclined bottoms; delivery spouts or chutes arranged at the forward ends thereof; furrow openers behind which said delivery spouts are arranged to deliver; feed conveyers arranged in the bottoms of said hoppers, consisting of sprocket chains having cross-pieces thereon; sprocket wheels for said chains; shafts on which said sprocket wheels are mounted; a driving connection for one of said shafts to said axle; toothed rollers arranged above said feed conveyers at their delivery ends; connection for driving said rollers in a direction opposite to that of said conveyers; toothed clearing rollers arranged below said conveyers at the delivery ends; and driving connections therefor, for the purpose specified.

5. The combination with a main frame of the carrying wheels; an axle therefor on which said frame is mounted; a pair of hoppers having forwardly inclined bottoms; delivery spouts or chutes arranged at the forward ends thereof; furrow openers behind which said delivery spouts are arranged to deliver; feed conveyers arranged in the bottoms of said hoppers, consisting of sprocket chains having cross-pieces thereon; sprocket wheels for said chains; shafts on which said sprocket wheels are mounted; a driving connection for one of said shafts to said axle; toothed clearing rollers arranged below said conveyers at the delivery ends; driving connections therefor; wheels having projecting fingers on their peripheries, arranged in said hoppers above said feed conveyers; a shaft on which said wheels are mounted, and driving connections therefor to the lower feed conveyer shaft, for the purpose specified.

6. The combination with a main frame of the carrying wheels; an axle therefor on which said frame is mounted; a pair of hoppers having forwardly inclined bottoms; delivery spouts or chutes arranged at the forward ends thereof; furrow openers behind which said delivery spouts are arranged to deliver; feed conveyers arranged in the bottoms of said hoppers, consisting of sprocket chains having cross-pieces thereon; sprocket wheels for said chains; shafts on which said sprocket wheels are mounted; a driving connection for one of said shafts to said axle; wheels having projecting fingers on their peripheries, arranged in said hoppers above said feed conveyers; a shaft on which said wheels are mounted; and driving connections therefor to the lower feed conveyer shaft, for the purpose specified.

7. The combination with a main frame of the carrying wheels; an axle therefor on which said frame is mounted; a pair of hoppers having forwardly inclined bottoms; delivery spouts or chutes arranged at the forward ends thereof; furrow openers behind which said delivery spouts are arranged to deliver; feed conveyers arranged in the bottoms of said hoppers, consisting of sprocket chains having cross-pieces thereon; sprocket wheels for said chains; shafts on which said sprocket wheels are mounted; a driving connection for one of said shafts to said axle; toothed clearing rollers arranged below said conveyers at the delivery ends; and driving connections therefor, for the purpose specified.

8. The combination with a hopper; a delivery spout or chute arranged at the forward end thereof; a furrow opener behind which said delivery spout is arranged to deliver; a feed delivery conveyer arranged in the bottom of said hopper; a toothed roller arranged above said feed conveyer at its delivery end; means for driving said roller in a direction opposite to that of said conveyer; a toothed roller arranged below said conveyer at its delivery end; and a wheel having projecting fingers arranged in said hopper above said feed conveyer, for the purpose specified.

9. The combination with a hopper; a delivery spout or chute arranged at the forward end thereof; a furrow opener behind which said delivery spout is arranged to deliver; a feed or delivery conveyer arranged in the bottom of said hopper; a toothed roller arranged below said conveyer at its delivery end; and a wheel having projecting fingers arranged in said hopper above said feed conveyer, for the purpose specified.

10. The combination with a hopper; a delivery spout or chute arranged at the forward end thereof; a furrow opener behind which said delivery spout is arranged to deliver; a feed or delivery conveyer arranged in the bottom of said hopper; a toothed roller arranged above said feed conveyer at its delivery end; means for driving said roller in a direction opposite to that of said conveyer; and a toothed roller arranged below said conveyer at its delivery end, for the purpose specified.

11. The combination with a hopper; a delivery spout or chute arranged at the forward end thereof; a furrow opener behind which said delivery spout is arranged to deliver; a feed or delivery conveyer arranged in the bottom of said hopper; and a toothed roller arranged below said conveyer at its delivery end, for the purpose specified.

12. In a root planting machine, the combination with a hopper, of a feed device arranged to take the roots from the bottom of the hopper; means for agitating said roots in said hopper above said feed device; a gage device coacting with said feed device to regulate the feeding of the roots; and a clearing device for said feed device, for the purpose specified.

13. In a root planting machine, the combination with a hopper, of a feed device; a gage device coacting with said feed device to regulate the feeding of the roots; and a clearing device for said feed device, for the purpose specified.

In witness whereof, I have hereunto set my hand and seal in the presence of two witnesses.

JOHN H. SHIRLEY. [L. S.]

Witnesses:
W. R. MALTBY,
FRANK CHAMBERLIN.